United States Patent [19]

Grew

[11] 4,045,891
[45] Sept. 6, 1977

[54] DEVICE FOR DIGGING, BALLING AND RELOCATING A TREE AND OTHER MATERIAL

[76] Inventor: Leonard A. Grew, 43 Kingston Road, Duluth, Minn. 55801

[21] Appl. No.: 650,565

[22] Filed: Jan. 19, 1976

[51] Int. Cl.² .............................................. A01G 23/06
[52] U.S. Cl. ..................................................... 37/2 R
[58] Field of Search ..................... 37/2 R, 182, 183 R, 37/187; 144/2 R, 2 N, 34 R, 34 A, 34 B; 214/147 R, 147 AS, 147 G, 148

[56] References Cited

U.S. PATENT DOCUMENTS

| | | | |
|---|---|---|---|
| 2,990,630 | 7/1961 | Crawford | 37/2 R |
| 3,193,951 | 7/1965 | Beeson | 37/187 X |
| 3,618,234 | 11/1971 | Bater | 37/2 R |

Primary Examiner—Ralph T. Rader
Assistant Examiner—R. E. Suter
Attorney, Agent, or Firm—Wicks & Nemer

[57] ABSTRACT

A device for digging, balling and relocating a tree for mounting on a vehicle having twin spaced booms having an attachment plate pivotally mounted thereto. The device includes a rear blade for connection with the attachment plate of the vehicle together with first and second arms rotatably mounted about the longitudinal axis thereof on the attachment plate. The arms are also pivotally mounted on the attachment plate. Each arm carries at the outer end thereof a side blade. A hydraulic ram rotates and pivots each of said arms to thereby move the blades thereof together or apart relative to the rear blade.

16 Claims, 16 Drawing Figures

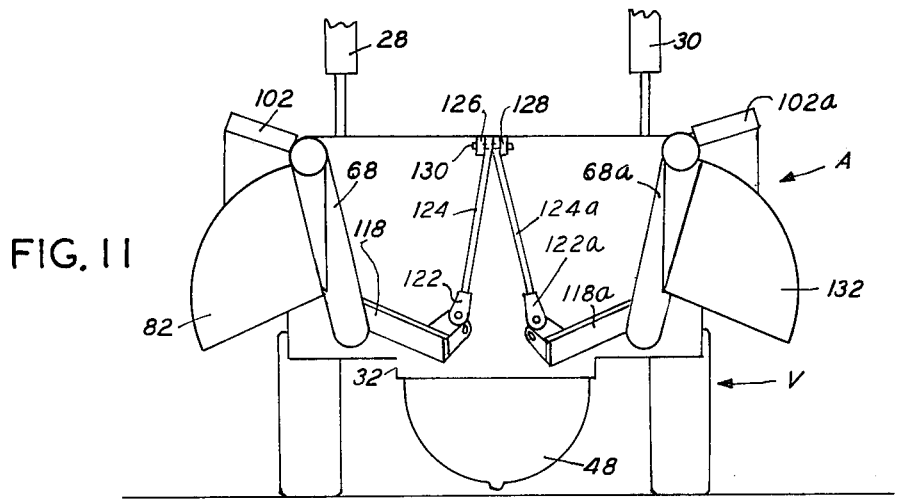
FIG. 11
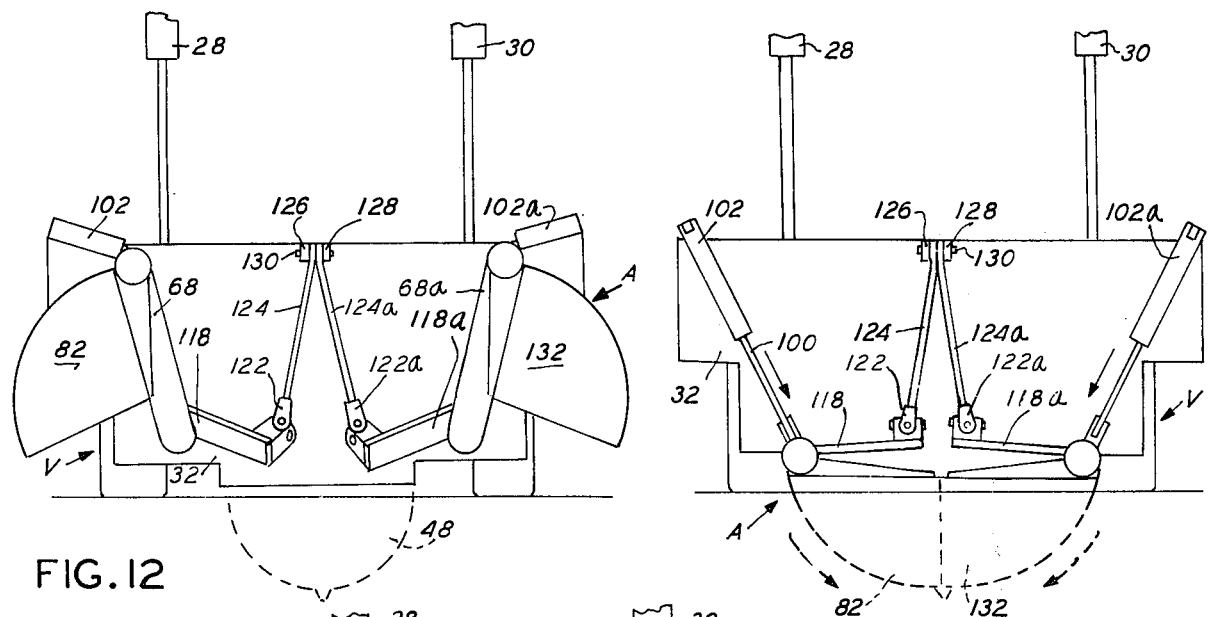
FIG. 12
FIG. 13
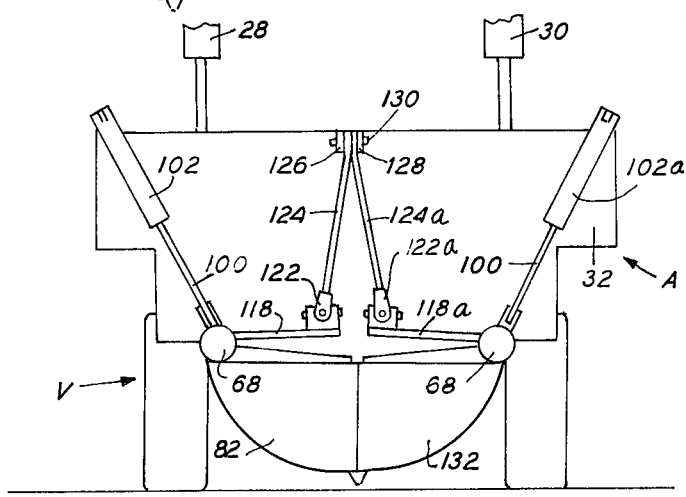
FIG. 14

DEVICE FOR DIGGING, BALLING AND RELOCATING A TREE AND OTHER MATERIAL

SUMMARY

The invention relates to an improvement in a device for digging, balling and relocating a tree and other material. The device includes three digging blades, a rear blade and two side blades, each a segment of one half of a sphere with sharpened mating edges. The side blades are each connected to a rotatable and pivotable arm while the rear blade is connected to a mounting means which is actuatable on a vehicle. A ram having a universal joint on the end of the piston of each ram is connected to the outer end of each arm with the inner end of the arms restrained whereby action of the ram rotates and pivots the arm thereby causing the blades to travel substantially in an arc which very efficiently cuts into ground and allows easy withdrawal.

With the device a standing tree may be dug up quickly and easily in a balled formation and moved to a hole previously dug by the device and deposited in the hole. Further the dug tree in balled condition may be "burlaped" for transportation by another vehicle.

The device attaches easily and quickly to any loader or tractor and requires no outriggers or other accessory for maximum operation. Further the device allows direct truck loading and unloading. Also the device may be used for digging ditches by digging a series of connected holes and transporting the dirt. Additionally the device may be used to "clam" out brush.

The invention will appear more clearly from the following detailed description when taken in connection with the accompanying drawings, showing by way of example a preferred embodiment of the inventive idea wherein like numerals refer to like parts throughout.

FIGS. 11-14 illustrate diagrammatically the movement of blades of the device from fully open position through the digging and lifting actions.

Figure 5:
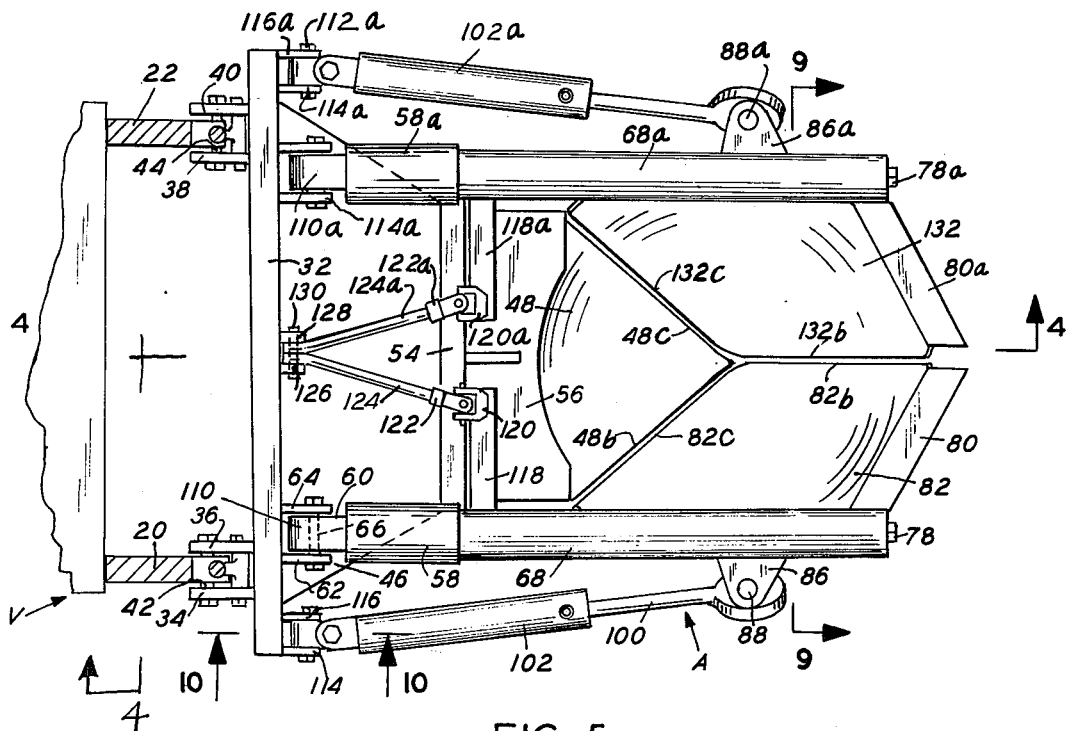
FIG. 5 is a top plan view of the device in the position shown in FIG. 4.

Referring to the drawings in detail, the device A is mounted on the front end of a conventional tractor vehicle V partially shown. The tractor has the twin spaced booms 20 and 22 with the lifting and lowering rams 24 and 26 and tilting rams 28 and 30. As best seen in FIG. 5, further provided is the attaching or attachment plate 32 having secured to the rear surface thereof the first pair of spaced flanges 34 and 36 and a second pair of spaced flanges 38 and 40. Flanges 34 and 36 are pivotally mounted on the boom 20 by means of the pin 42 and the flanges 38 and 40 are pivotally mounted on the boom 22 by means of the pin 44. The rams 28 and 30 are pivotally connected to the flanges 34 and 36 and 38 and 40, respectively, for tilting the plate 32. By activating rams 24 and 26, plate 32 can be lifted or lowered.

Figure 1:
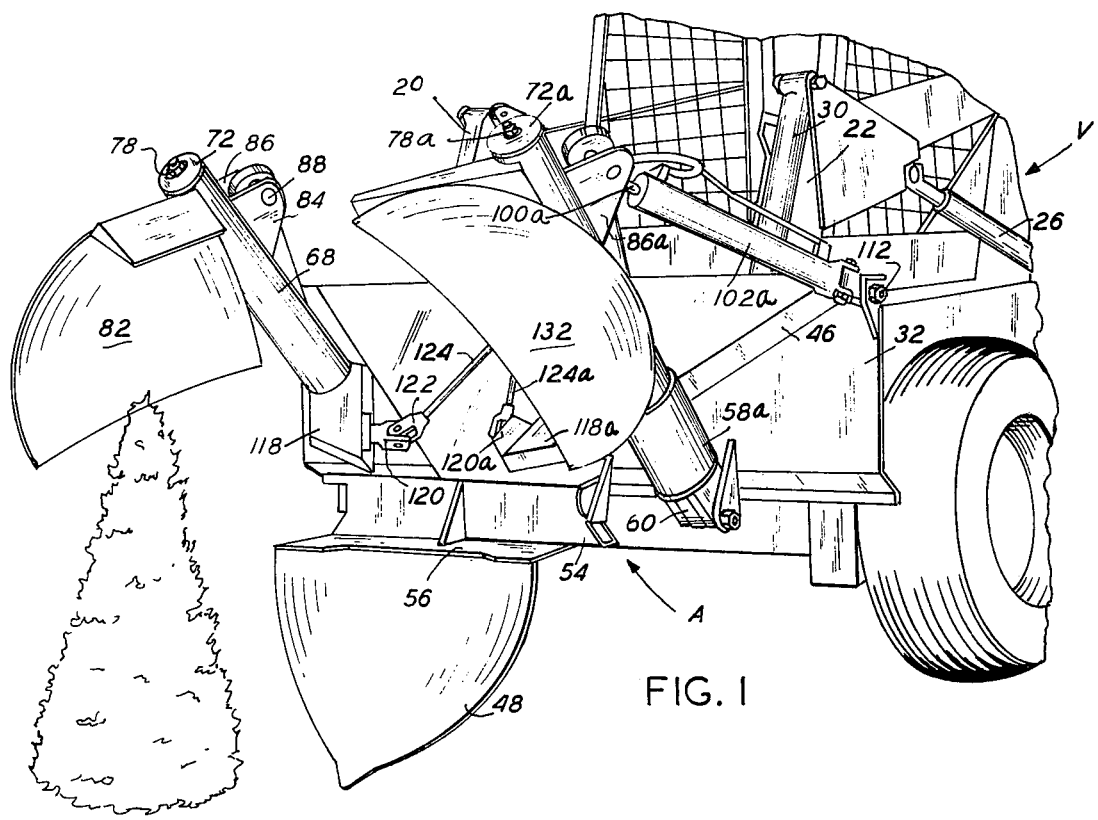
FIG. 1 is a perspective view of a device for digging, balling and relocating trees and other material embodying the invention and shown mounted on the front end of a mobile vehicle having a hydraulic lifting mechanism with the device in fully open position.
Figure 2:
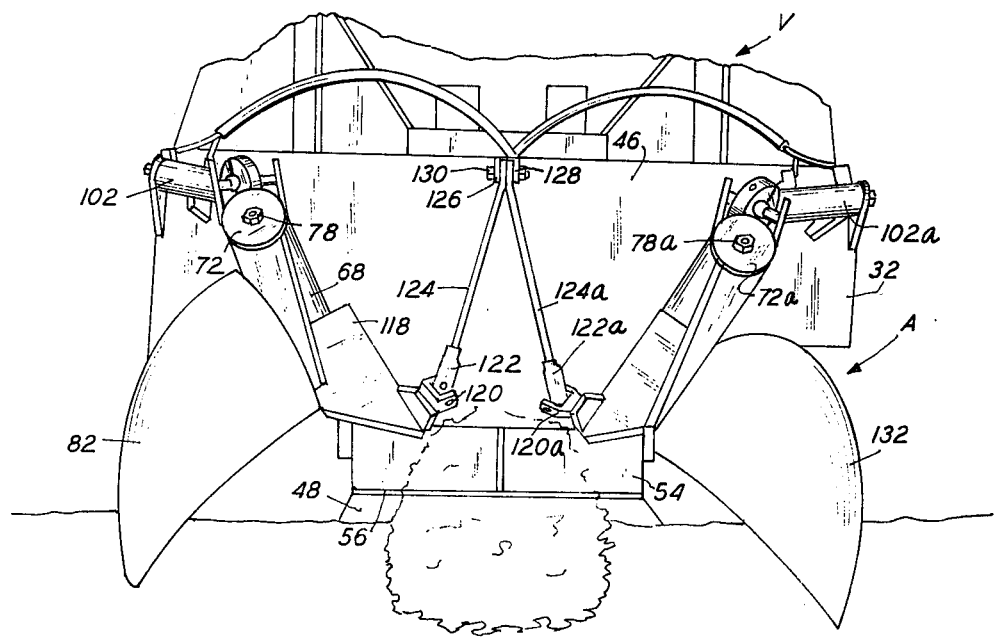
FIG. 2 is a front end view of the device with the side blade segments partially inserted into the ground and with the rear blade segment having been inserted into the ground with a tree shown in broken lines.
Figure 2A:
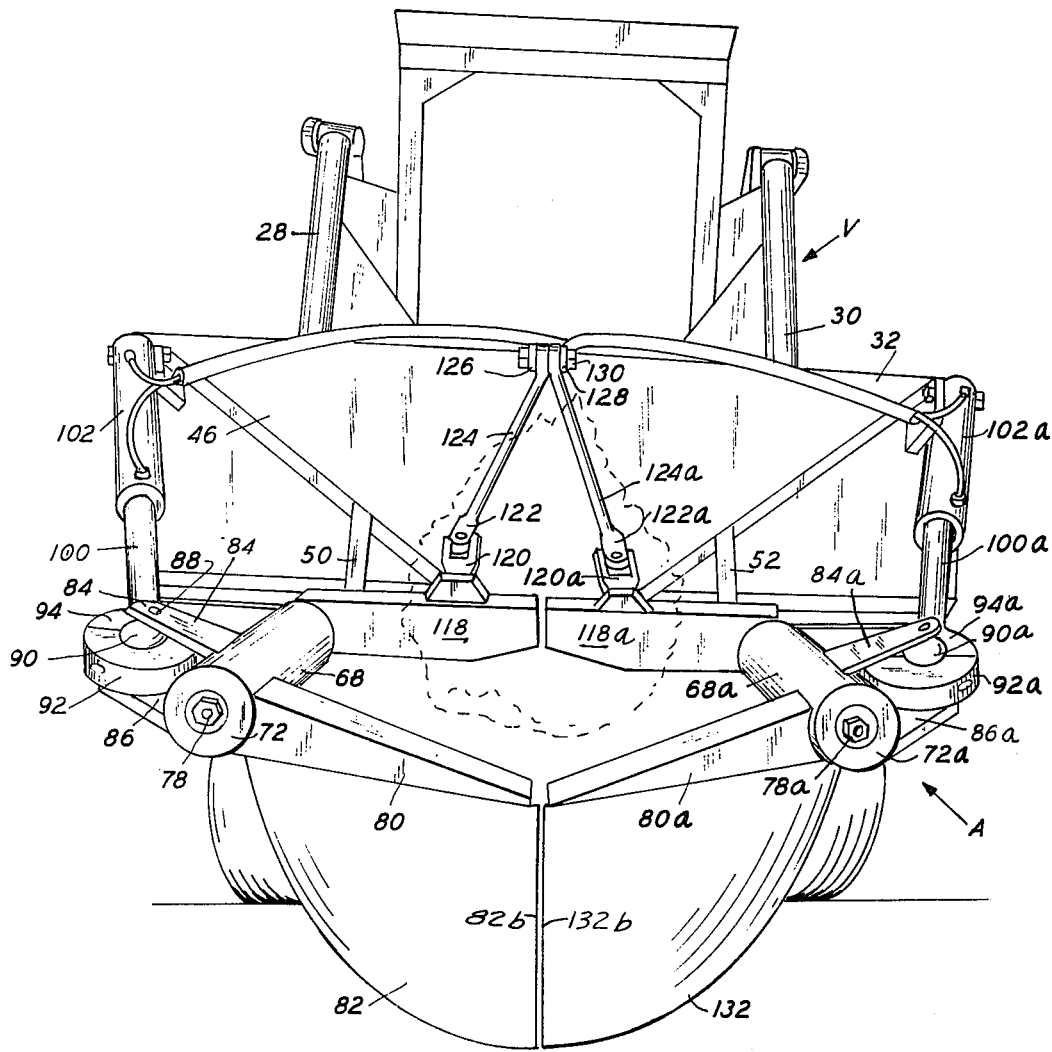
FIG. 2a is a front end view of the device with the blade segments in fully closed position about the roots of a tree in a lifted condition for transporting.
Figure 3:
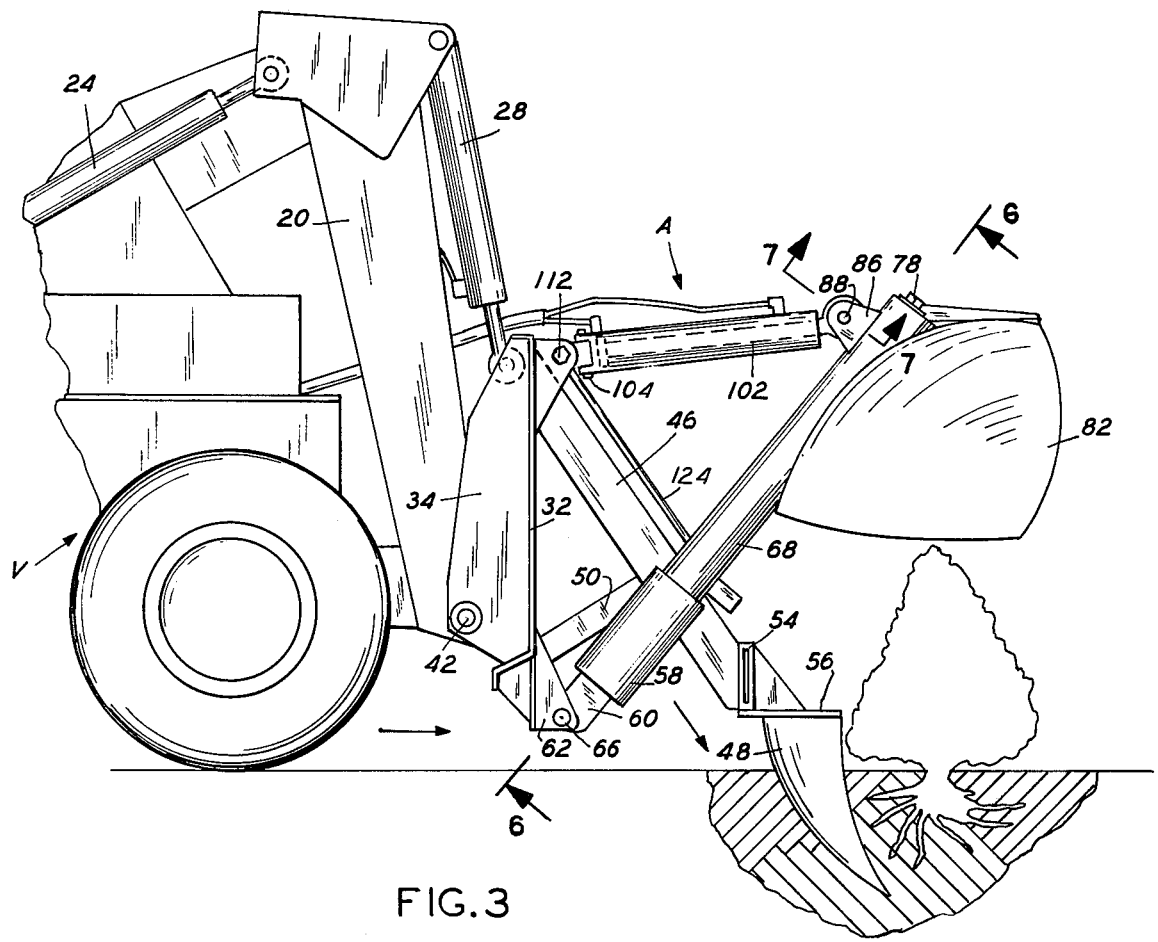
FIG. 3 is a side elevational view of the device with the rear blade segment partially inserted into the ground and the side blade segments in raised positions.
Figure 4:
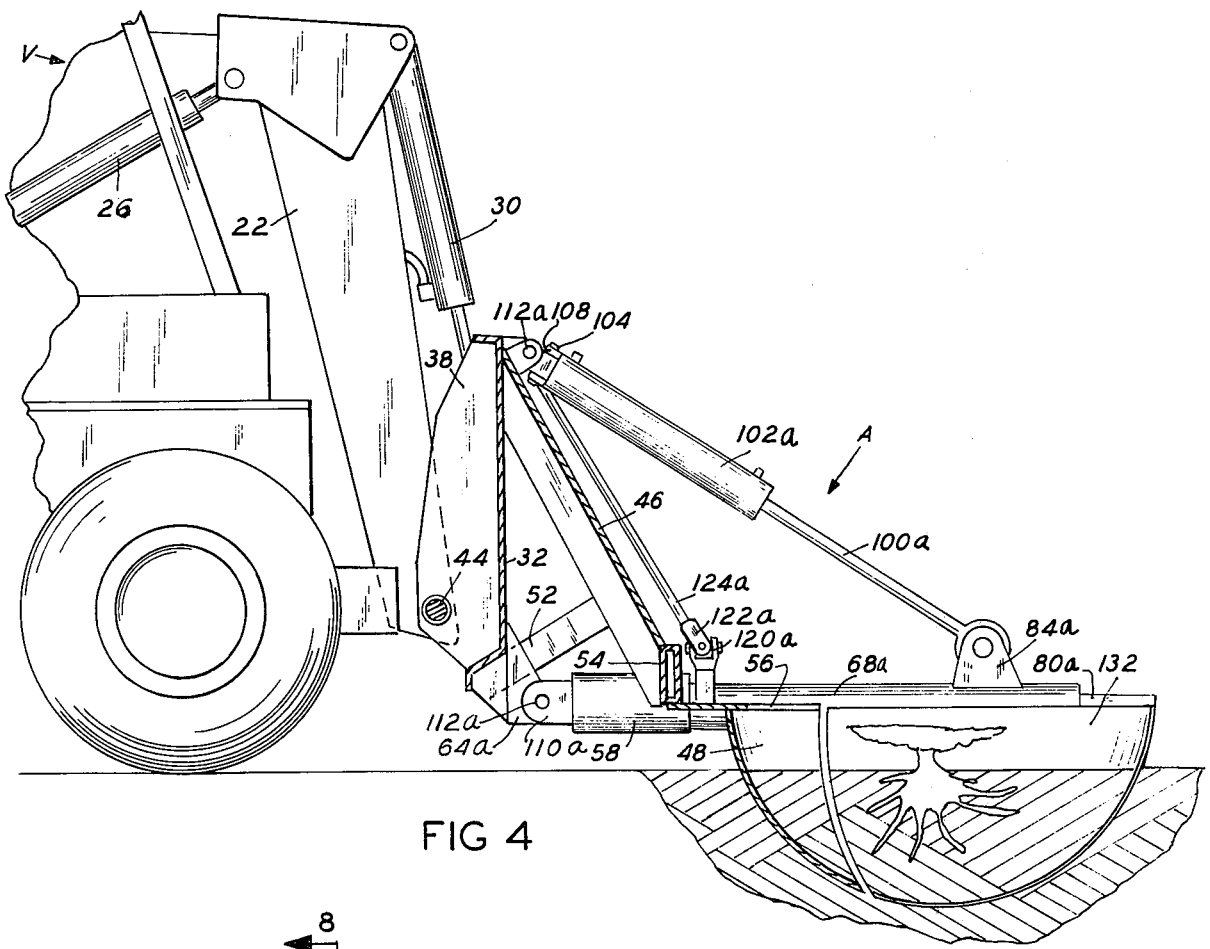
FIG. 4 is a view similar to FIG. 3 but with the side blades inserted into the ground.

As best seen in FIGS. 1, 2, 2a, 3 and 4, the numeral 46 designates a mount for rigidly connecting the rear blade segment or rear blade 48 to the plate 32, the mount being connected rigidly to the attaching plate 32 and angularly disposed thereto. The blade segment 48 is formed with cutting edges 48b and 48c as best seen in FIG. 5. The mount is braced by the braces 50 and 52 as best seen in FIGS. 2a, 3 and 4 which are connected at the forward ends to the rear face of the mount and at the rear ends to the plate 32. As best seen in FIGS. 2a, 3 and 4, the mount 46 has secured to the lower edge thereof the cross member 54 to which is secured the lip 56. The rear hemispherical blade segment or rear blade 48 is connected to and depends from the lip 56. The rear blade 8 is tiltable on the axis of the pins 442 and 44 by means of the rams 28 and 30.

Figure 6:
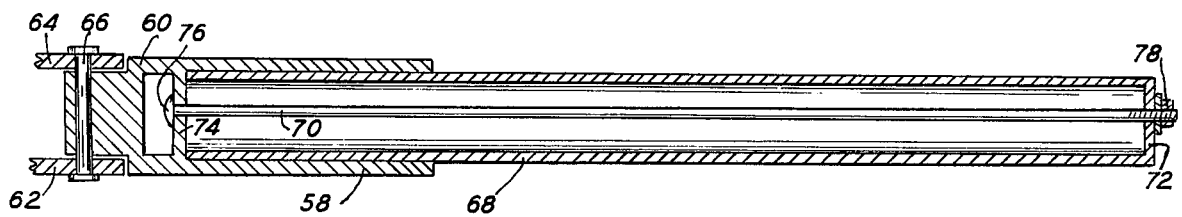
FIG. 6 is a sectional view on the line 6—6 of FIG. 3.

Further provided is a first cylindrical socket 58 having the mounting hub 60 pivotally mounted between the ears 62 and 64 by means of the pin 66, see particularly FIGS. 3, 5 and 6. Rotatably mounted in the socket 58 is the tubular arm 68 which is rotatably held in the socket by means of the threaded rod 70 which extends through the end wall 72 and the back wall 74 of the socket 58 secured by the weld 76 and nut 78. Therefore arm 68 is rotatably and pivotally held to the attaching plate by socket 58 and hub 60, ears 62, 64, and pin 66.

Figures 7, 8:
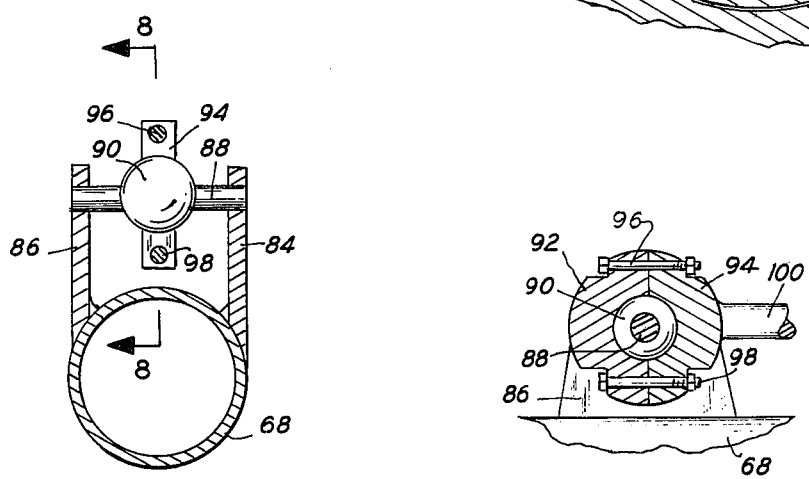
FIG. 7 is a sectional view on the line 7—7 of FIG. 3.
FIG. 8 is a sectional view on the line 8—8 of FIG. 7.
Figures 9, 9A:
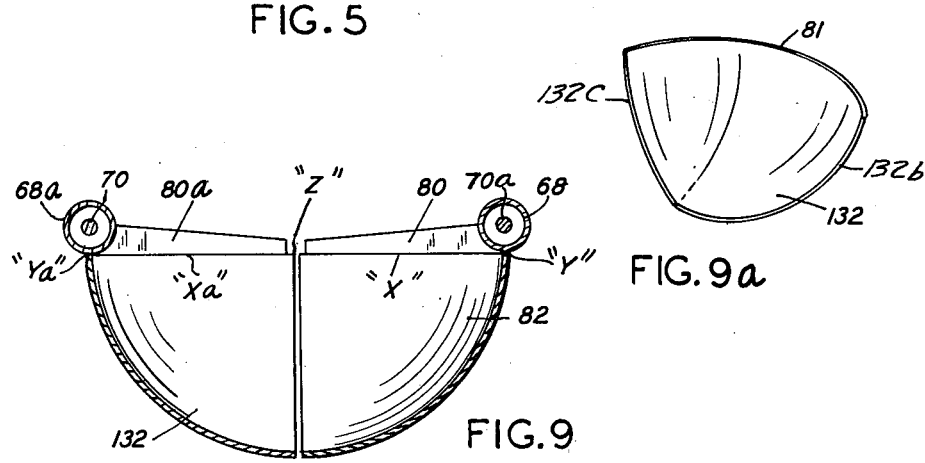
FIG. 9 is a sectional view on the line 9—9 of FIG. 5.
FIG. 9a is a perspective view of one of the blades.
Figure 10:
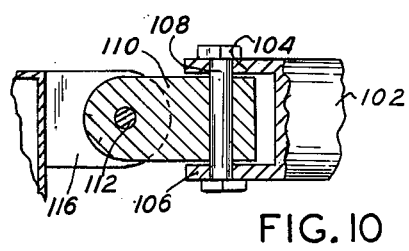
FIG. 10 is a sectional view on the line 10—10 of FIG. 5.

As best seen in FIGS. 5 and 9, the numeral 80 designates a forward arm connected at its inner end to the cylindrical arm 68 and extending angularly relative to the arm 68. Further provided is the first blade segment or side blade 82 which is in the form of a segment of approximately one-third of one-half of a sphere with the meeting edges 82b and 82c having sharpened edges, and the blade is secured to the forward arm 80 at one edge portion 81 as at "X" and to the forward portion of tubular arm 68 on a further edge portion thereof as at "Y" as by welding particularly FIG. 9. As best seen in FIGS. 2a and 7, secured to the arm 68 adjacent to the outer end thereof are the spaced ears 84 and 86 to which is connected the pin 88 to which is securely mounted centrally thereof the ball 90. Mounted on the ball 90 for movement thereon are the first and second one-half socket members 92 and 94, respectively, held together by the bolts 96 and 98. Secured to the half socket 94 is the piston 100 of the ram 102. Therefore, the end of the ram 102 is universally joined to arm 68. As best seen in FIGS. 5 and 10, formed on the other end of the ram 102 are the spaced ears 104 and 106 through which the pin 108 is mounted. The numeral 110 designates a hinger block pivoted on one end to the pin 108 and on the other end on the pin 112 connected to spaced ears 114 and 116. The ears 114 and 116 are connected to the attaching plate 32. Therefore, the other end at ram 102 is universally joined to attaching plate 32.

Secured to the inner end of the tubular arm 68 and extending inwardly thereof is the lug 118, see particularly FIGS. 1, 2, 5, and 8, and mounted on the outer end of the lug 118 is one-half of conventional universal joint indicated as 120. The other half of the joint indicated as 122 is secured to the lower end of the stabilizing radius rod 124 with the upper end of the rod 124 pivotally connected to the ears 126 and 128 by means of the pin 130. Therefore, rod 124 is universally joined to the lug by universal joints 120 and 122. Without the rods 124 and 124a, the arms 68 and 68a and blades thereon would simply be raised up and down and out by the rams 102 and 102a.

The universal joint 120 allows the lug 118 to pivot as it is raised with the arm 68 and similarly with universal joint 120a and lug 118a on arm 68a. Further provided, as best seen in FIGS. 5 and 9, is a remaining second blade segment or side blade 132 in the form of a segment of approximately one-third of one-half of a sphere mounted on, actuated by structure substantially identical to that which mounts and actuates the blade 82 as herein described. Identical parts are designated by identical reference numerals accompanied by the lower case letter a. The three blades 48, 82 and 132 when juxtaposed as shown particularly in FIGS. 2a, 4, 5, 9, 13 and 14 substantially form a receptable having an open top and, in the preferred embodiment, a half sphere, which after inserted in the earth cradles a tree or other material. The blades segments 82 and 132 move on substantially a constant radius, however do not move on a precise constant radius due to the fact that the rod 70 is not quite on the same radius as point Ya with respect to the point "Z".

Therefore, blade 82 is moveably mounted to plate 32 allowing movement from a first closed position to a second open position on substantially a constant radius by arm 68 rotatably and pivotally held to plate 32 by socket 58 and hub 60, ears 62, 64, and pin 66, with the blade 82 attached to arm 68 at Y and to arm 80 which is attached to arm 68 at X. Arm 68 is pivoted by and simultaneously stabilized and positioned to cause rotation by ram 102 and stabilizing rod 124 and the parts associated therewith as explained herein before.

OPERATION

Reference is made to FIGS. 1 and 11 wherein the blades are in the full open position as a result of the operation of rams 102 and 102a to closed positions. The rear blade segment 48 is forced into the ground by lowering the device by means of the booms 20 and 22 which blade serves as an anchor for the device A. When the rams 102 and 102a are moved to a closed position, the rotatable tubular arms 68 and 68a and the blades therein are lifted to the open position with the pivoting radius rods 124 and 124a causing the blades 82 and 132 to move substantially in a constant radius to an open position. As the rams 102 and 102a are moved to a closed position to open the blade segments 82 and 132, the tubular arms 68 and 68a and the blade segments thereon are caused to rotate in the sockets 58 and 58a and elevate with the radius rods 124 and 124a holding the tubular arms and causing the rotation thereof. When the rams 102 and 102a are moved to an open position to close the blades 82 and 132 the arms are again caused to rotate in the sockets 58 and 58a and lower to thereby move the blades to separated open positions, FIG. 1.

Going from the fully open position of the blades with the blade 48 in the ground, the blades 82 and 132 are actuated to the positions of FIGS. 2 and 2a and 12 and 13 by means of the operation of the rams 102 and 102a.

As the rams 102 and 102a are extended, the same lower the tubular arms and blades thereon as seen in FIG. 13 and simultaneously the radius rods 124 and 124a swing about the pivot pin 130 through the universal joints 122-120 and 120a-122a. With the holding action of the radius rods on the lugs 118 and 118a of the tubular arms 68 and 68a, the tubular arms 68 and 68a are caused to rotate in the respective sockets 85 and 85a thereby causing the blades 82 and 132 to move on substantially a constant radius to meet and close.

With the blade segments not moving in an absolute constant radius as described above, the blades compact the earth as the same are moved to a closed position. When the blades are moved from a closed compacting position upon the earth to an open position the blades withdraw slightly and release from the compacted earth which tends to remain compacted which makes for less disturbance of the earth with a substantially clean release of the blades from the earth.

With the structure disclosed, standing trees may be dug up quickly and easily and moved to a hole previously dug by the same machine and deposited in the hole. On the other hand the dug tree may be burlaped for transportation by another vehicle for later planting. Further it will be seen that the device can be used to dig a ditch by taking series of adjoining scoops of earth and dumping the same where desired. Additionally, the device may be used to move material, and as a further example it may be used to clam out brush by use of the clamping action of the blades on the brush. The device is in the nature of a quick attachable accessory adaptable to a variety of loader type vehicles and removable when not needed to allow use of the loader for other purposes.

After the blades 48, 82 and 132 are fully closed about tree roots and earth, as an example, the entire device A is raised by means of raising the booms 20 and 22. The device A may be tilted by means of the rams 28 and 30. With the device A clear of the ground, the same may be transported over the ground to a hole in the ground into which the dug tree may be placed, or transported to a place for balling with burlap or the like for sale for subsequent planting. It will be seen that when the tree and the earth taken therewith by the device is placed in a hole in the ground that the reversal of the action of the blades above described rotatably removes the blades from between the earth taken and the hole in which it is placed with a minimum of disturbance of the earth held within the blades.

Having thus described the invention, what is claimed as new and desired to be secured by Letters Patent is:

1. A device for digging, balling and relocating trees and other material for mounting on a vehicle having actuatable mounting means comprising, in combination:
   a. a rear blade for connection with the mounting means and actuation thereby such that the rear blade can be forced into the ground by lowering the mounting means,
   b. first and second arms having longitudinal axes,
   c. means for rotatably mounting each of said arms about the longitudinal axis thereof on the mounting means,
   d. means for pivotally mounting each of said arms at one end thereof on said mounting means about an axis substantially perpendicular to the longitudinal axis of the arm,
   e. a first side blade carried by said first arm,
   f. a second side blade carried by said second arm, g. means for simultaneously rotating and pivoting each of said arms to thereby move said first and second side blades together and adjacent said rear blade and to thereby separate said first and second side blades from each other and said rear blade.

2. The device of claim 1 in which each of said first and second side blades is a segment of a sphere.

3. The device of claim 2 in which said means for rotatably mounting each of said arms about the longitudinal axis thereof includes:
   a. a socket in which one end of the arm is rotatably mounted.

4. The device of claim 1 in which said means for rotatably mounting each of said arms about the longitudinal axis thereof includes:
   a. a socket in which one end of the arm is rotatably mounted.

5. The device of claim 3 in which said means for rotating and pivoting each of said arms includes:
   a. a first ram pivotally connected at one end to the mounting means and at the other end to a universal joint connected to said first arm,
   b. a second ram pivotally connected at one end to the mounting means and at the other end to a universal joint connected to said second arm,
   c. a first lug connected to and extending from the end of said first arm,
   d. a second lug connected to and extending from the end of said second arm,
   e. a first rod connected with a universal joint at one end to said first lug and with the other end of said first rod, pivotally connected to the mounting means, and
   f. a second rod connected with a universal joint at one end to said second lug and with the other end of said second rod, pivotally connected to the mounting means.

6. The device of claim 1 in which said means for rotating and pivoting each of said arms includes:
   a. a first ram pivotally connected at one end to the mounting means and at the other end to a universal joint connected to said first arm,
   b. a second ram pivotally connected at one end to the mounting means and at the other end to a universal joint connected to said second arm,
   c. a first lug connected to and extending from the end of said first arm,
   d. a second lug connected to and extending from the end of said second arm,
   e. a first rod connected with a universal joint at one end to said first lug and with the other end of said first rod, pivotally connected to the mounting means, and
   f. a second rod connected with a universal joint at one end to said second lug and with the other end of said second rod, pivotally connected to the mounting means.

7. The device of claim 2 in which said means for rotating and pivoting each of said arms includes:
   a. a first ram pivotally connected to one end to the mounting means and at the other end to a universal joint connected to said first arm,
   b. a second ram pivotally connected to one end to the mounting means and at the other end to a universal joint connected to said second arm,
   c. a first lug connected to and extending from the end of said first arm,
   d. a second lug connected to and extending from the end of said second arm,
   e. a first rod connected with a universal joint at one end to said first lug and with the other end of said first rod, pivotally connected to the mounting means, and
   f. a second rod connected with a universal joint at one end to said second lug and with the other end of said second rod, pivotally connected to the mounting means.

8. Device for digging, balling, and relocating material for use with a vehicle having an attachment plate and means for lifting and lowering the attachment plate comprising, in combination:
   a. a rear blade segment, a first side blade segment, and a second side blade segment, with the rear, first and second side blade segments substantially forming a receptable having an open top when in a juxtaposed relation,
   b. means for rigidly connecting the rear blade segment to the attachment plate such that the rear blade segment can be forced into the ground by lowering the attachment plate,
   c. means for moveably mounting the first side blade segment to the attachment plate allowing movement from a first closed position to a second open position on substantially a constant radius and,
   d. means for moveably mounting the second side blade segment to the attachment plate allowing movement from a first closed position to a second open position on substantially a constant radius, with the rear blade segment, the first side blade segment in the closed position, and the second side blade segment in the closed position being in a juxtaposed relation substantially forming a receptacle having an open top.

9. The device of claim 8 wherein the means for moveably mounting the first side blade segment and wherein the means for moveably mounting the second side blade segment each comprises, in combination:
   a. an arm,
   b. means for rotatably and pivotally holding the arm to the attachment plate,
   c. means for securing the blade segment to the arm and,
   d. means for pivoting the arm and for simultaneously stabilizing and positioning the arm causing rotation of the arm as the arm is pivoted.

10. The device of claim 9 wherein the pivoting and stabilizing and positioning means comprises, in combination:
   a. a hydraulic ram having a first end universally joined to the attachment plate and having a second end universally joined to the arm,
   b. a lug attached to the arm, and
   c. a stabiliing radius rod having a first end pivotally connected to the attachment plate and a second end universally joined to the lug.

11. The device of claim 10 wherein the rear, first and second side blade segments form approximately one-half a sphere when in a juxtaposed relation.

12. The device of claim 11 wherein each of rear, first and second side blade segments has a size approximately equal to one-third of one-half of a sphere.

13. The device of claim 12 wherein the vehicle further includes means for tilting the attachment plate such that the device can be tilted by the tilting means and can be raised and lowered by the lifting and lowering means.

14. Device for digging, balling and relocating material for use with a vehicle having an attachment plate and means for lifting and lowering the attachment plate comprising, in combination:
 a. a first side blade segment and a second side blade segment, with the first and second side blade segments at least partially forming a receptacle having an open top when in a juxtaposed relation,
 b. first and second arms having longitudinal axes,
 c. means for rotatably mounting each of said arms about the longitudinal axis thereof on the attachment plate,
 d. means for pivotally mounting each of said arms at one end thereof on the attachment plate about an axis substantially perpendicular to the longitudinal axis of the arm, and
 e. first and second means for rotating and pivoting said first and second arms, respectively, with the first blade segment being carried by the first arm and the second blade segment being carried by the second arm, to thereby move the first and second side blade segments together and to separate the first and second side blade segments.

15. The device of claim 14 further comprising, in combination:
 a. a rear blade segment,
 b. means for rigidly connecting the rear blade segment to the attachment plate such that the rear blade segment can be forced into the ground by lowering the attachment plate wherein the first and second side blade segments are moved together and adjacent the rear blade segment.

16. The device of claim 14 wherein the first and second means for rotating and pivoting said first and second arms, respectively, includes:
 a. a ram pivotally connected at one end to the attachment plate and at the other end to a universal joint connected to said arm,
 b. a lug connected to and extending from the end of said arm, and
 c. a rod connected with a universal joint at one end to said lug and with the other end of said rod, pivotally connected to the attachment plate.

* * * * *